Aug. 13, 1963 N. MARFORIO 3,100,463
SEWING MACHINE FOR EFFECTING THE TWO-THREAD CHAIN STITCH
Filed Nov. 14, 1960 12 Sheets-Sheet 4

Aug. 13, 1963  N. MARFORIO  3,100,463
SEWING MACHINE FOR EFFECTING THE TWO-THREAD CHAIN STITCH
Filed Nov. 14, 1960  12 Sheets-Sheet 8

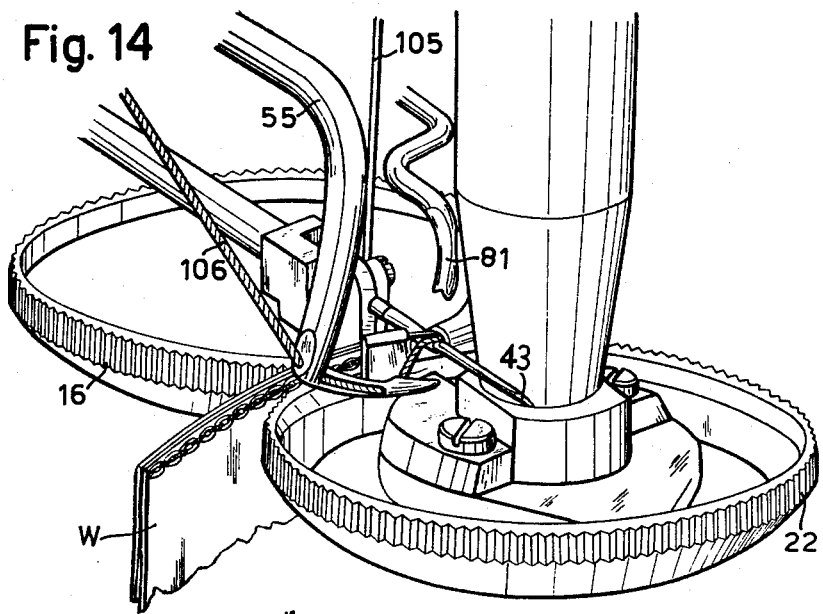
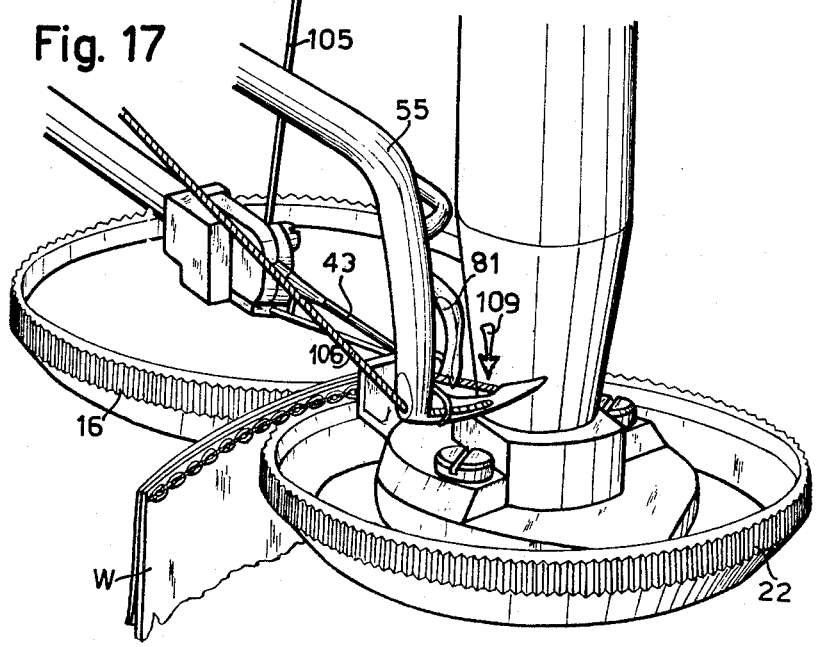

Aug. 13, 1963 N. MARFORIO 3,100,463
SEWING MACHINE FOR EFFECTING THE TWO-THREAD CHAIN STITCH
Filed Nov. 14, 1960 12 Sheets-Sheet 10
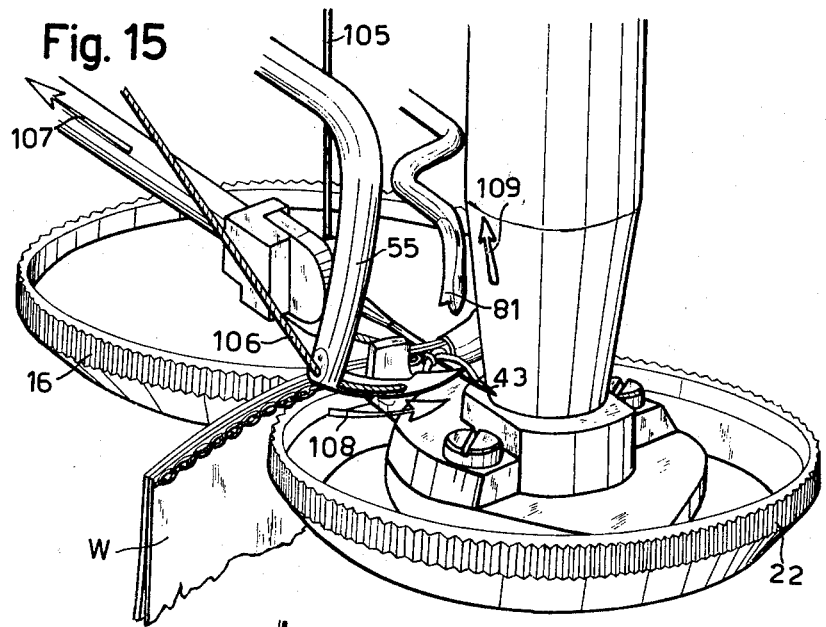
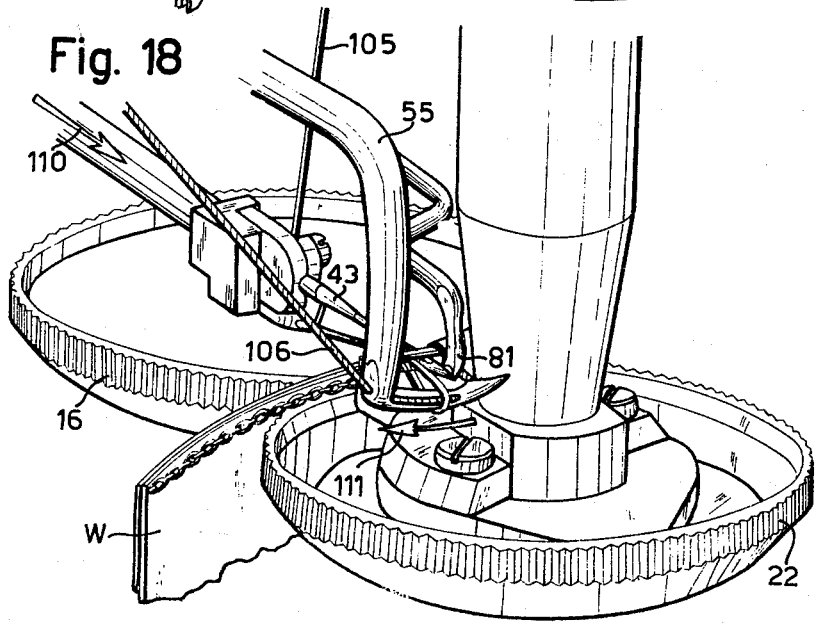

Aug. 13, 1963   N. MARFORIO   3,100,463
SEWING MACHINE FOR EFFECTING THE TWO-THREAD CHAIN STITCH
Filed Nov. 14, 1960   12 Sheets-Sheet 12

INVENTOR
Nerino Marforio
BY Robert E Burns
ATTORNEY

United States Patent Office 3,100,463
Patented Aug. 13, 1963

3,100,463
SEWING MACHINE FOR EFFECTING THE
TWO-THREAD CHAIN STITCH
Nerino Marforio, Milan, Italy, assignor to S.p.A. Virginio
Rimoldi & C., Milan, Italy, a company of Italy
Filed Nov. 14, 1960, Ser. No. 68,781
3 Claims. (Cl. 112—16)

This invention relates to an improved sewing machine intended for high speed production in industrial practice of sewing fashioned outer knitted garments manufactured on straight knitting machines.

This application is a continuation-in-part of application Serial No. 623,745 filed November 21, 1956, which application has now been abandoned.

It relates especially to machines of the cup feed type in which the work is retained and advanced by a pair of cups arranged for rotation about parallel vertical axes and in which the stitch is formed by the cooperation of a reciprocable needle with a thread carrying looper and a threadless spreader.

An object of the present invention is to provide an improved machine of the type set forth above which is capable of producing a two-thread chain stitch of improved type especially adapted for sewing knitted fabrics or the like.

Another object of the invention is to provide a machine of the character referred to which is provided with means of novel conception facilitating adjustment of the looper position with respect to the needle for their proper timing during stitch formation.

A further object of the invention is to provide a sewing machine of simple construction, reliable in operation action and adapted for high speed operation, and constructed in such manner as to render its mechanism easily accessible for inspection and maintenance.

These and other objects of the invention and the advantages attained thereby will be readily understood by those skilled in the art from the following disclosure referred to a preferred embodiment of the invention illustrated in the accompanying drawings in which:

FIG. 14 is a perspective view explaining the formation of a stitch by the machine according to the invention in which the thread carrying looper, spreader and needle are shown in their one operative position.

FIGS. 15 to 19 are similar perspective views, in which the thread carrying looper, spreader and needle are shown in their further successive operative positions.

*General Structure*

Figure 1:
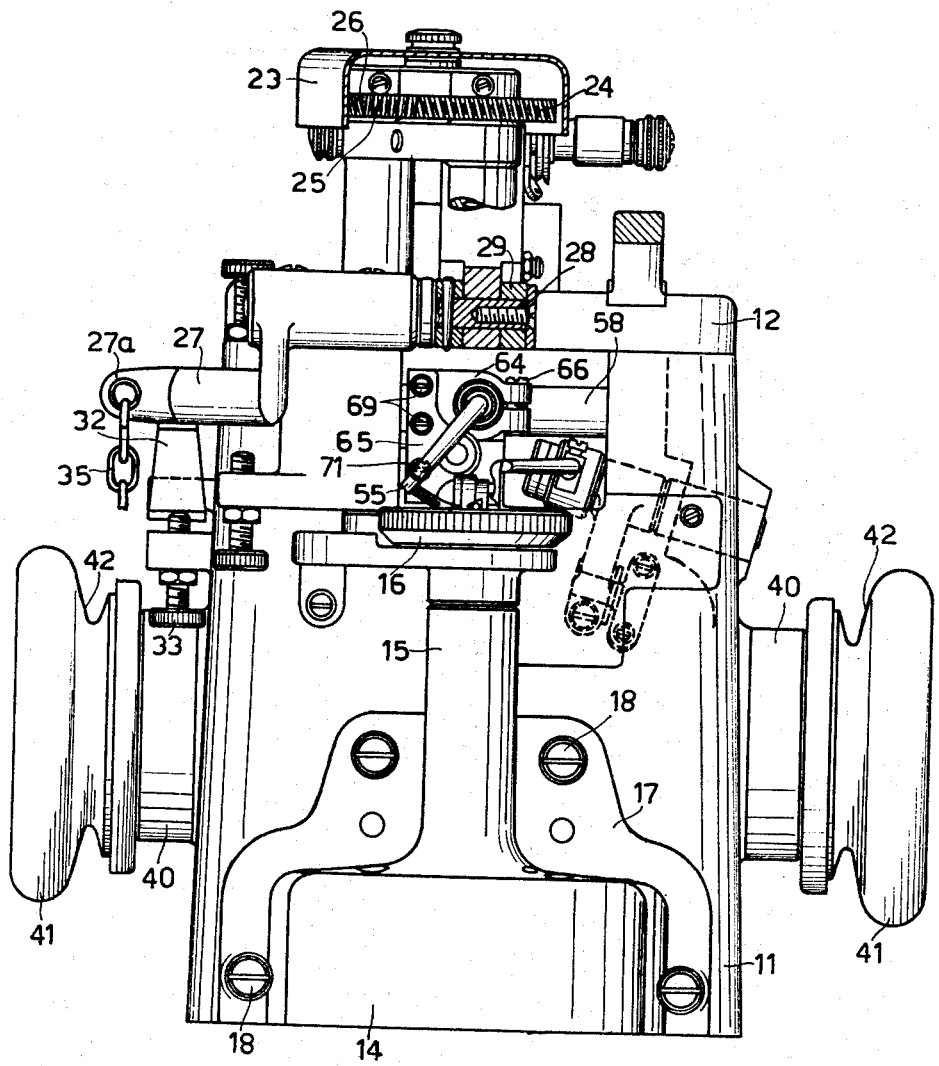
FIG. 1 is a front elevation of a sewing machine according to the invention with the outer feed-cup removed and a portion of its supporting shaft broken away.
Figure 2:
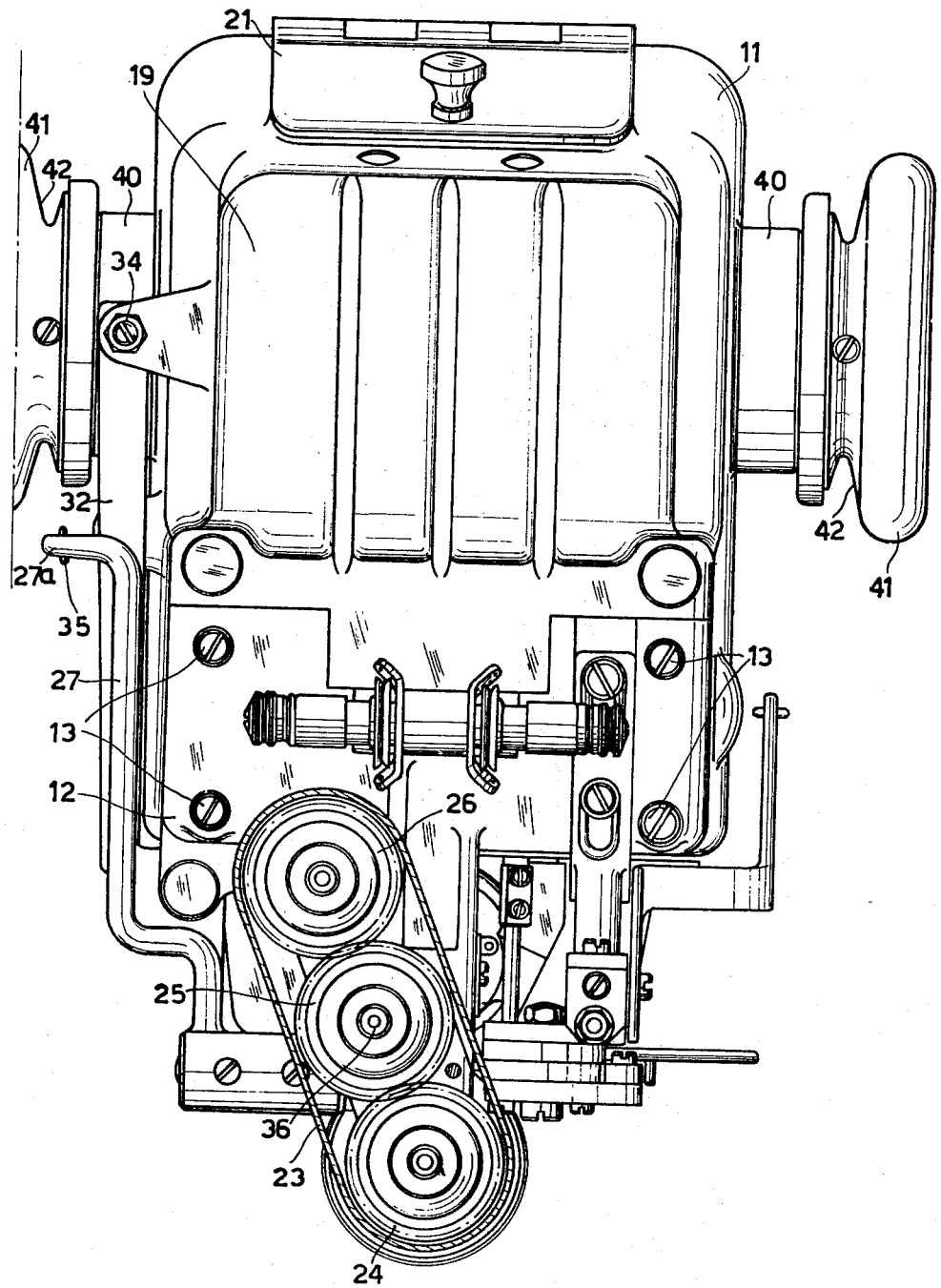
FIG. 2 is a top plan view of the machine with the upper cover-plate sectioned to a show a detail of the drive for the outer feed-cup.

Turning now to the drawings the illustrated embodiment of the invention comprises a frame having a base-portion or standard 11, adapted to rest upon and be supported by a table (not shown) and an overhanging bracket or arm 12 secured to the base-portion by means of screws 13 (FIG. 2). Disposed beneath the overhanging bracket 12 is an extension 14 and a supporting column 15 for sustaining the inner feed-cup 16 of the feeding mechanisms. The extension 14, which in the embodiment illustrated is provided with a flange 17 secured to the fore wall of the base portion 11 by means of screws (FIG. 1) but may be made integral with the latter, provides a housing for some of the actuating mechanisms for the inner feed-cup 16. The interior of the frame is hollow substantially throughout, except for the cross beams 10 and 10' and provides a chamber 18 (FIGS. 5 and 6) closed at its top by a removable cover 19, provided with suitable securing knobs, which permits access to mechanism within the machine for purposes of inspection and maintenance. Access to the lower part of the chamber 18 is made possible by providing in the rear wall of the frame an opening 20 closed by a tiltable door 21. Cooperating with the inner feed-cup 16 is an outer feed-cup 22 which depends from the overhanging bracket 12. Removably secured over the top of the bracket 12 is a cover-plate 23 encircling the gears 24, 25 and 26 which form part of the mechanism driving the outer feed-cup 22. The latter can be shifted away from the inner feed-cup 16 by depressing the outer feed-cup supporting lever 27 (FIGS. 1, 2, 5 and 6) pivoted about the shaft 28 and having a split forward end 29 which encircles the sheath 30 in which is journalled the upper feed shaft 31. The lever 27 is constantly urged upwardly by the action of a flat spring 32, the tension of which can be adjusted by acting on the screws 33 and 34 (FIGS. 1 and 2), and has secured to its free end 27a a chain 35 for connecting the lever 27 to a pedal (not shown) situated below the table (not shown) supporting the frame 11 of the machine. The upper feed-shaft 31 is connected to a shaft 36 having keyed thereto the gear 24 with the interposition of a Cardan joint 37 in order to allow the rocking movement of the shaft 31 necessary for shifting the outer feed-cup 22 away from the inner feed-cup 16, and desirable to facilitate introduction of the work between the two feed-cups.

A main rotary shaft 38 extends from side to side of the machine frame 11 and is journaled in suitable bushings 39 fixed in flanged sleeves 40 (FIG. 4) secured in openings cut in the side walls of the frame 11. Mounted on the opposite ends of the main shaft 38 are the balance wheels 41 each having a belt groove 42. The main shaft 38 is formed with a crank, and has secured thereto three eccentrics, for actuating all the connections within the chamber 12.

The machine is provided with a suitable lubricating system of which only some details are shown in the drawings, inasmuch as said system is not a part of the present invention.

Needle Bar Mechanism

Figure 4:
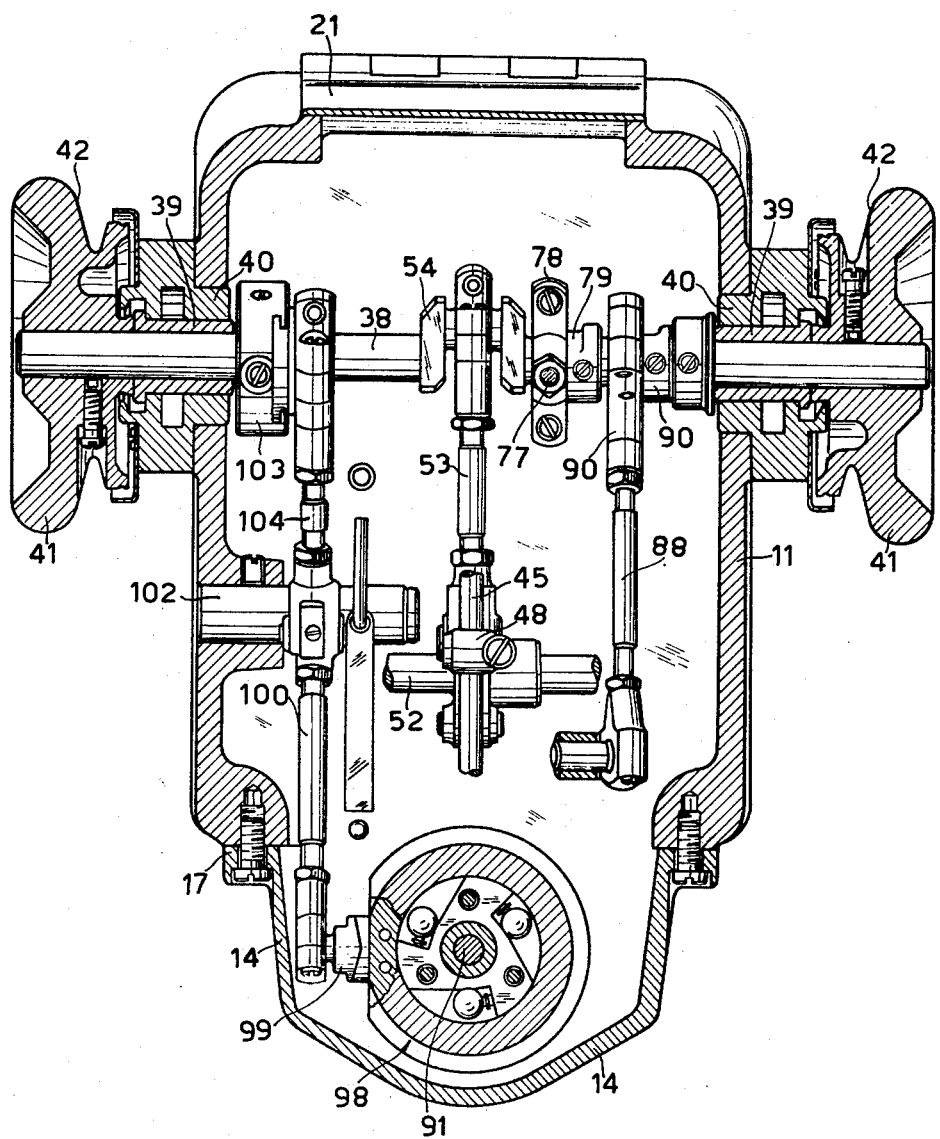
FIG. 4 is a horizontal sectional view taken through the machine frame showing the main shaft and clutch drive for the feed-cups.
Figure 5:
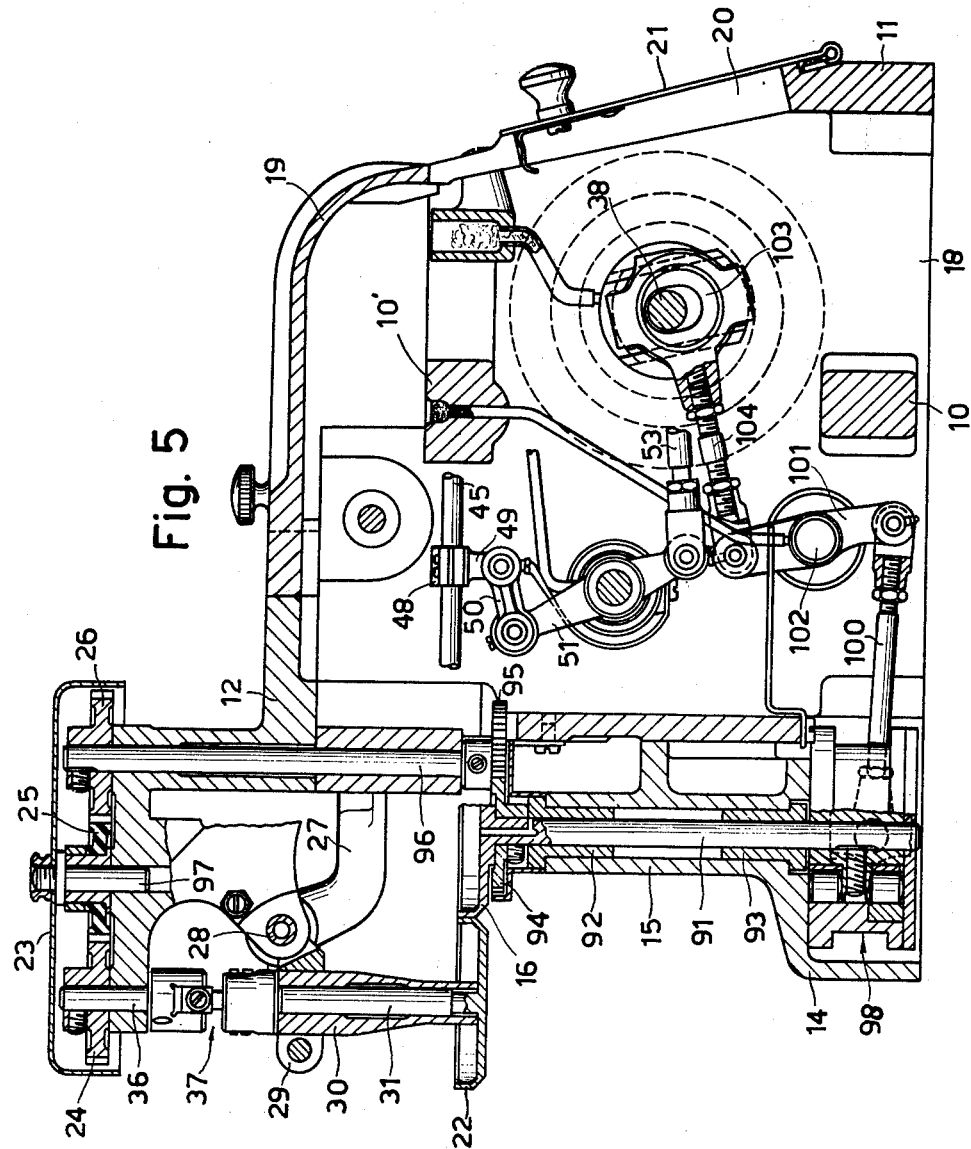
FIG. 5 is a vertical longitudinal sectional view taken through the machine frame along line V—V of FIG. 4 illustrating the needle-bar mechanism and feeding mechanism.
Figure 6:
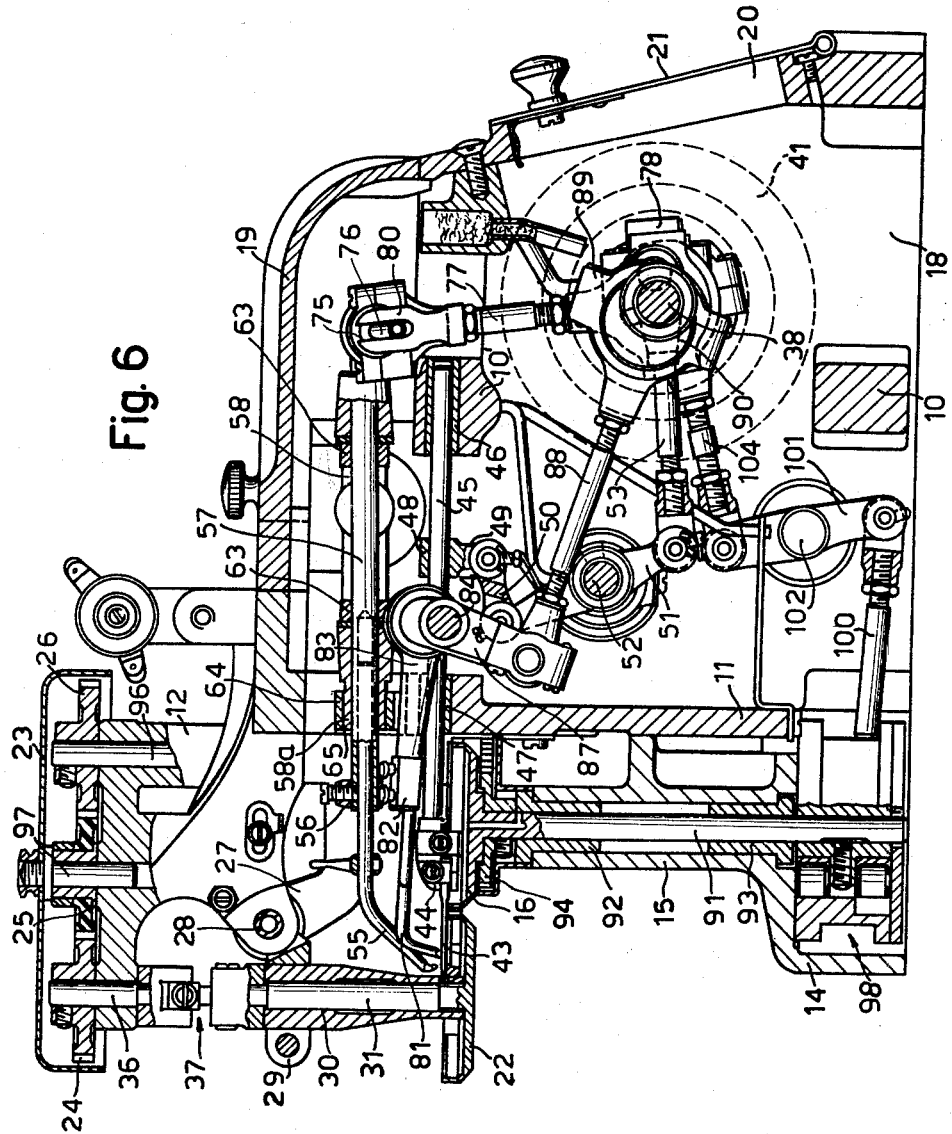
FIG. 6 is a vertical longitudinal sectional view taken through the machine frame along line VI—VI of FIG. 4 showing the thread carrying looper mechanism and spreader mechanism.
Figure 7:
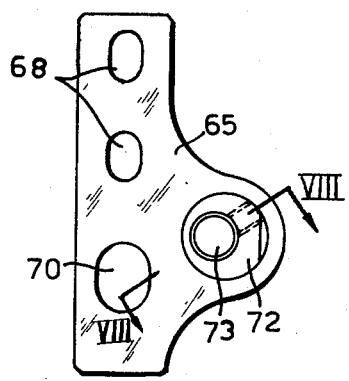
FIG. 7 is an enlarged scale elevational front view of a detail of the structure shown in FIG. 1.
Figure 8:
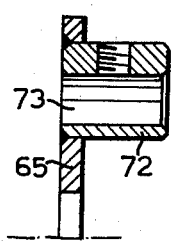
FIG. 8 is a section taken along line VIII—VIII of FIG. 7.
Figure 9:
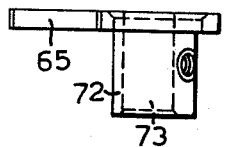
FIG. 9 is a side view of the detail shown in FIG. 7.
Figure 10:
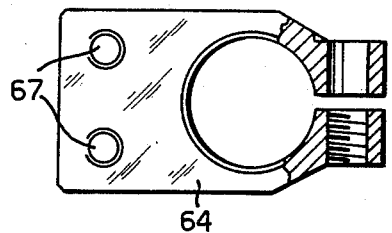
FIG. 10 is an enlarged scale elevational front view of another detail of the structure shown in FIG. 1.
Figure 11:
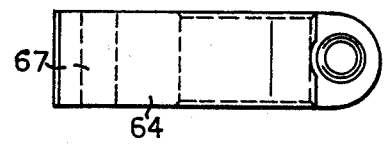
FIG. 11 is a side view of the detail shown in FIG. 10.

Referring to FIGS. 4 to 6 it will be seen that the needle-bar mechanism comprises a needle 43 held in the needle clamp 44 secured on a horizontally arranged reciprocating needle bar 45 journalled in bushings 46 and 47 supported in the cross beam 10 and front wall of the machine frame 11. The needle bar 45 has clamped thereto intermediate its ends a collar 48 provided with a depending lug 49 connected by a link 50 to the upper limb of a rock-lever 51 mounted upon a fulcrum shaft 52 supported in the side walls of the machine frame 11. Connected to the lower limb of the rock-lever 51 is a rod 53 which is connected at its other end to a crank 54 formed in the main-shaft 38. Rotation of the latter imparts to the needle-bar 45 through the above described elements a reciprocatory motion which will be obviously in time with the other stitch forming elements to be described later.

Looper Mechanism

Figure 3:
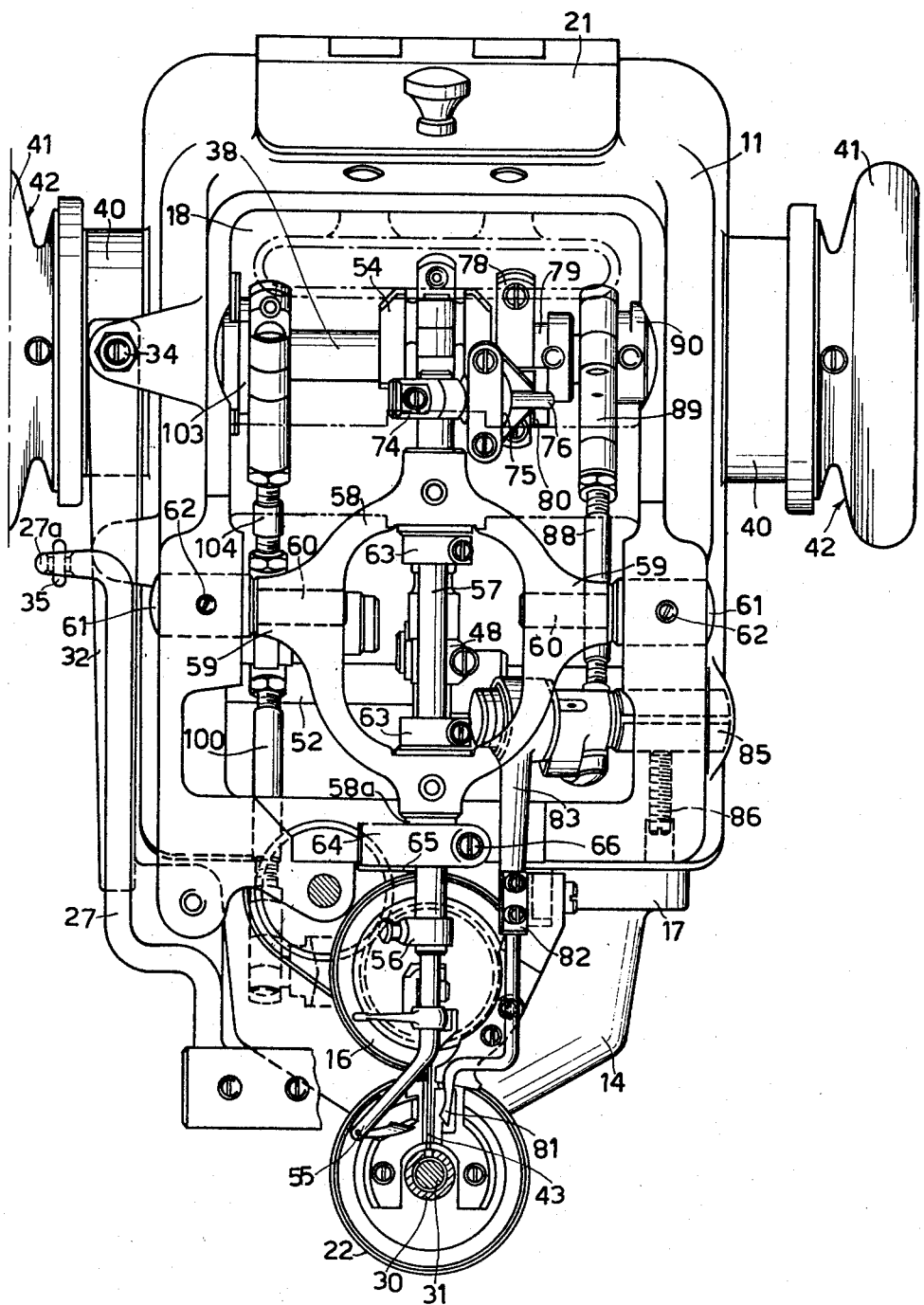
FIG. 3 is a top plan view of the machine with the lower cover-plate removed illustrating the arrangement of the supporting members for the thread carrying looper and spreader.

The looper 55 which is of threaded type, is secured, as will be seen from FIGS. 3 and 6, in a clamp 56 provided on the outer end of a supporting shaft 57 journalled for oscillation in a cross-head 58 having lateral hubs 59 receiving pivots 60 having their heads 61 fastened to the side of the frame 11 by means of screws 62. Any axial displacement of the supporting shaft 57 with respect to the cross-head 58 is prevented by means of split collars 63 clamped on the supporting shaft inside the cross-head 58.

Referring to FIGS. 3 and 4 it will be observed that the looper supporting shaft 58 is arranged above the needle-bar 45 and has its axis arranged substantially in the same vertical plane in which the axis of the needle bar is situated. Also both above mentioned axes are illustrated in the drawings nearly parallel to each other, the invention providing means for adjusting the angular position of the supporting shaft with respect to the needle bar.

Said means, illustrated in greater detail in FIGS. 7 to 11, comprises a split collar 64 clamped about a forward extension 58a on the cross head surrounding the looper supporting shaft 57, and a plate 65 secured to the top portion of the front wall of the machine frame 11 just above the opening provided in the latter for receiving the bush 47 slidably supporting the fore portion of the needle-bar 45. The collar is clamped by means of the screw 66 and has bored therein on its other side two vertically spaced tapped bores 67 which are in register when the machine is assembled with elongated openings 68 provided in the plate 65. The latter is arranged in front of the collar 64 and is secured thereto by means of screws 69, as shown in FIG. 1. Under the openings 68 there is provided in the plate an opening 70 the dimensions of which are substantially greater than those of the openings 68. A screw 71 extends through the opening and is screwed in a tapped bore, not visible on the drawings, provided near the top edge of the front wall of the frame 11, in order to secure the plate 65 to the front wall. The plate 65 has further fastened thereto a bush 72 provided with an axial eccentric bore 73 for supporting a cam (not shown) where the needle bar is equipped with a cooperating thread press, if so desired.

It will be obvious that with the structure above described adjustment of the angular position of the cross-head 58 together with the looper supporting shaft can be readily effected. For this purpose it is merely necessary to loosen the screw 71, move the plate 65 together with the collar 64 upwardly or downwardly and finally again tighten the screw for securing the parts in their desired position. The width of the opening 70 in the plate 65 makes possible an adjustment of the cross-head 50 in a transverse direction. To this end the screws 62 (FIG. 3) are first loosened and the pivots 60 are axially displaced with respect to the machine frame 11. The purpose of the adjustments in position of the looper 55 is to obtain a correct stitch formation on variation in elastic properties of the thread used for forming the stitch. For instance, an adjustment will be necessary when a machine using a cotton thread is to be adapted for operation with the use of threads made of synthetic filaments or other highly resilient threads.

Turning now to FIGS. 3 and 6 it will be seen that the end of the looper supporting shaft 57 opposed to that at which the looper 55 is secured projects from the cross-head 58 and has clamped thereto one end of a rock lever 74 which has at its other end a ball 75 and a guide pin 76. The ball is received in a socketed upper end of a pitman 77 formed at its lower end with a split strap 78 embracing an eccentric 79 fastened on the main shaft 38. A forked member 80 straddling the pin 76 prevents the pitman 77 from turning.

Spreader Mechanism

The spreader 81 cooperates with the looper 55 to spread the thread-loop presented by the latter for entrance by the needle 43 prior to its penetration of the fabric. The spreader 81, see FIGS. 3 and 6, is forked at its free end and is secured by a clamp 82 provided at the end of a lever 83 fastened on a supporting shaft 84 journalled in an angularly disposed elongated bushing 85 fixed in the machine frame 11 by means on a screw 86. A rock lever 87 is clamped on shaft 84 and has its other end engaged by a pitman 88 whose lower end is formed with a strap 89 surrounding an eccentric 90 secured to the main shaft 38 by means of a screw, like the eccentric 79 transmitting movement from the main shaft to the threaded looper 55. From the foregoing disclosure it appears that the spreader position can be adjusted by acting on the clamp 82 or angularly shifting the eccentric 90 with respect to the main shaft 38. This is useful for properly timing the spreader and adapting the machine for working with highly resilient threads such as threads made of synthetic filaments, instead of with threads having ordinary properties such as cotton thread or the like. It is further pointed out that the spreader has not only the function to distend the loop of the looper thread to cause the needle to enter same just before it penetrates the fabric, but also the function of supporting the needle when it projects forwardly from the fabric, in order to prevent any oscillation of the needle.

Feeding Mechanism

The inner feed cup 16 is carried (FIG. 5) at the upper end of a vertical feed actuating shaft 91 which is journalled in spaced bushings 92 and 93 fixed in the column 15 carried by the frame extension 14. The feed shaft 91 has fastened near its upper end portion right below the inner feed cup 11 a spur-gear 94 which meshes with a second spur gear 95 secured to the lower end of a vertical shaft 96 partly journalled in the upper part of the front wall of the frame 11 and overhanging bracket 12, respectively. The vertical shaft has fastened to its upper end portion the gear 26 which meshes with the gear 25 rotatably supported on a short shaft 97 fastened to the bracket 12. The gear 25 meshes in turn with the gear 26 secured to the upper end of the shaft 36 transmitting drive to the upper feed shaft 31. The shaft 91 is intermittently rotated by a one-way clutch 98 of well known structure which will not be described in detail, through an actuating arm 99 connected by a link 100 to the lower end of a lever 101 journalled on a stationary fulcrum stud 102 fixed in a lug integral with the machine frame. The lever 101 is oscillated on the fulcrum stud 102 by an adjustable eccentric mounted 103 on the main shaft through a pitman 104.

Stitch and Stitch Formation

Figure 12:
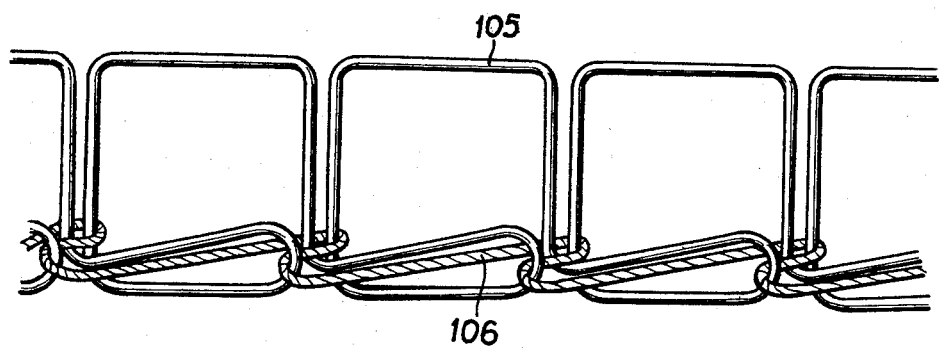
FIG. 12 is a diagrammatical enlarged view of the stitch obtained by the machine according to the invention.
Figure 13:
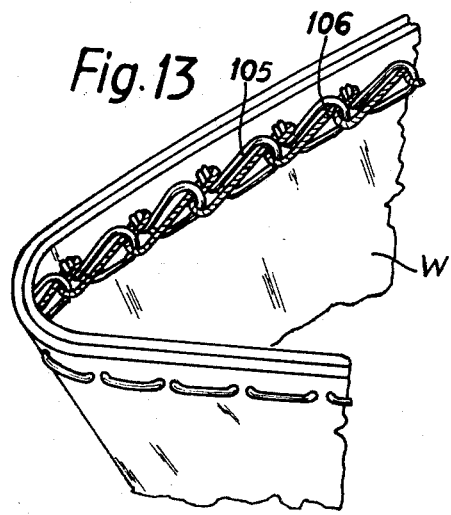
FIG. 13 is an enlarged perspective view of two fabric pieces sewn together by means of the stitch illustrated in FIG. 12.

The stitch actually obtained by the improved machine is shown in FIGS. 12 and 13. As will be apparent from these figures, the stitch obtained is a modification of the two-thread chain stitch, such as the 401 type stitch contemplated by the Standard Stitch Catalogue. The white thread 105 is the needle thread and the hatched thread 106 is the looper thread. As it appears from the drawing, in the stitch formed by the machine according to the invention there are three segments on the same side of the fabric, a single segment only is made from the looper thread, while the remaining two threads are made from the needle thread. This construction is convenient, since a great length of the needle thread in the seam obtained makes the stitch highly resilient. This feature is of importance in view of the large use of the two-thread chain stitch in sewing of knitted fabrics. It is further to be noted that the stitch produced by the machine according to the invention establishes a very firm connection. In fact, in addition to crossing the fabric the needle thread is superposed thereon. In this case the friction between the needle thread and fabric is increased, avoiding the risk of the stitch becoming easily loose.

The manner in which the stitch is formed will be readily understood from FIGS. 14 to 19, which show six successive stages of the formation of the stitch preceding and, following respectively, a feed movement of the cups 16 and 22.

In FIG. 14 the needle is shown at the end of its forward stroke, the looper 55 at the end of its rocking movement away from the needle and the spreader 81 in an intermediate position during its upward movement. These positions correspond to the end of the stitch forming process and beginning of the formation of a successive stitch. In FIG. 15 the needle 43 is shown at the beginning of its backward movement in the direction of the arrow 107, the thread 105, having formed near the needle bore a loop which is entered by the end of the looper 55 which oscillates in the direction of the arrow 108. The spreader 81 is at the end of its upward movement.

Figure 16:
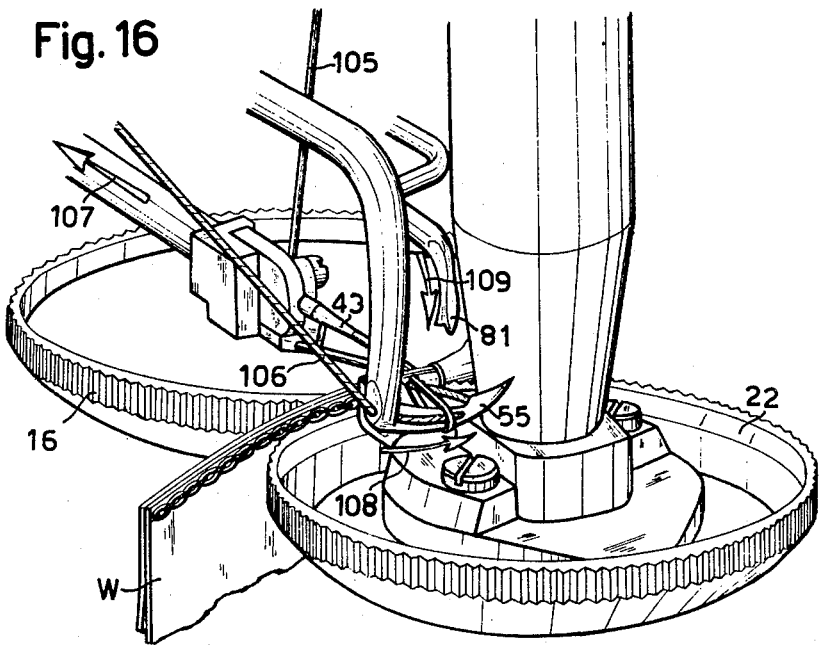
Figure 19:
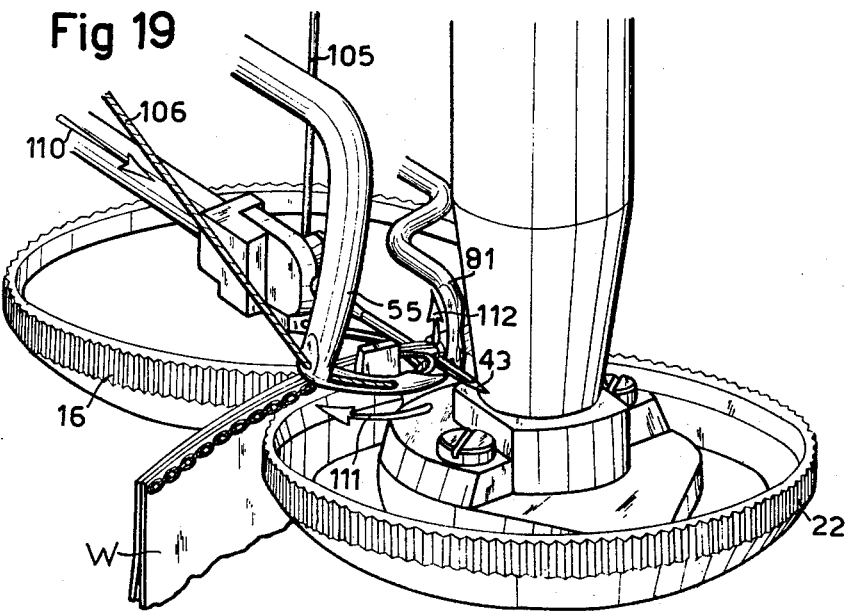
Figure 20:
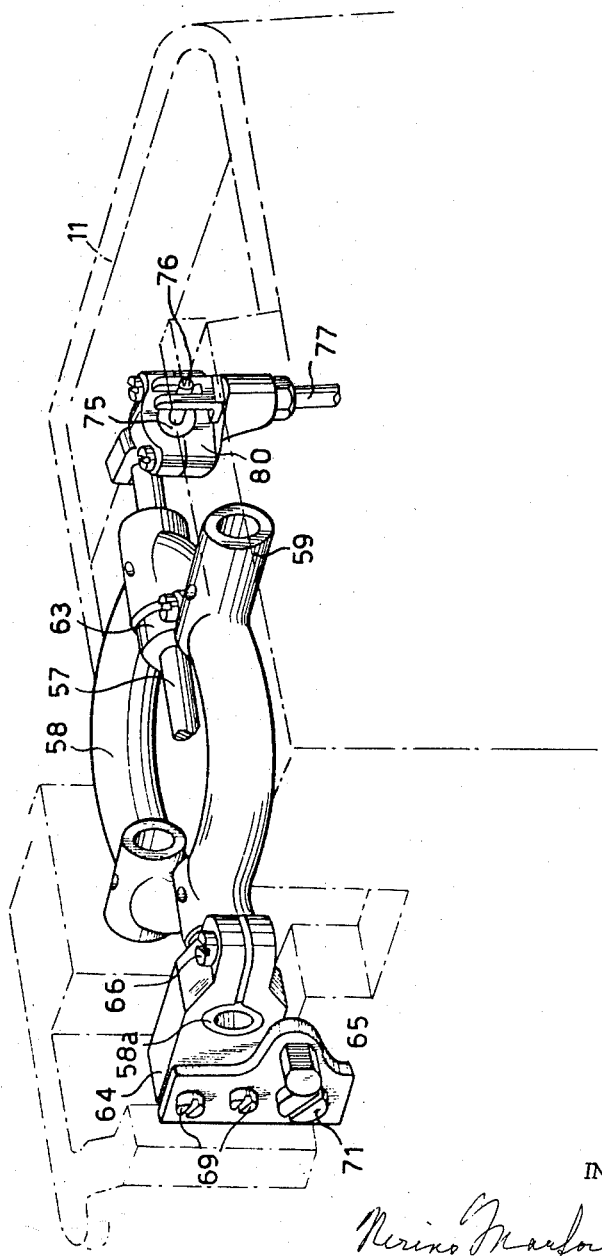
FIG. 20 is a perspective view of the looper shaft shown in the previous figures.

In FIG. 16 the needle 43 and the looper 55 are shown at a further stage of their movements in the direction of the arrows 107 and 108. The looper 55 has already caught the loop of the thread 105 and has passed therethrough its thread 106. The spreader 81 performs its downward movement in the direction of the arrow 109 in order to meet the thread 106 after it has been passed through the loop previously taken by the looper 55.

In FIG. 17 the needle 43 is shown at the end of its backward stroke and is fully withdrawn from the work, the cups 16 and 22 effecting their feeding movement. The looper 55 is at the end of its forward stroke and the spreader 81 following its downward movement has engaged by its fork-shaped end the looper-thread 106. Thereafter the needle 43 again passes through the work moving in the direction of the arrow 110 (FIG. 18), the looper performing its backward movement in the direction of the arrow 111, whereby the loop in the thread 105 slides towards the end of the looper 55. However, the spreader 21 which has reached the end of its downward movement, holds the thread 106 which was passed through the loop of the needle thread 105 and occupies a position in which it prevents any oscillation of the needle in a horizontal plane.

The needle now passes over the portion of the thread 106 lying between the work and end of the looper 55 and below the portion of this thread 106 lying between said spreader end and the bore in the looper 55. As this is accomplished both the looper 55 and spreader 81 can be withdrawn. The looper 55 pursues its backward movement in the direction of the arrow 111 and the spreader 81 begins its upward movement in the direction of the arrow 112 (FIG. 12). The thread 106 surrounds the needle end and the needle thread loop having already left the looper 55 presses the thread 106 against the work, inasmuch as the thread 105 is drawn by the effect of the forward movement of the needle 43. Thus the needle 43 and the looper 55 first and the spreader 81 later reverse their movement and the operations are repeated as disclosed above.

What I claim is:

1. In a sewing machine for effecting a two-thread chain stitch and having a machine, the combination comprising, a pair of feed cups counter-rotatable and between which the work is clamped for forward feed, a needle bar for carrying a needle and slidably mounted in the machine frame for reciprocating said needle over a path extending through the axes of the cups and perpendicular thereto, means for reciprocating said needle bar, a shaft oscillatable about an axis arranged above said needle bar, a thread-carrying looper clamped to an end of said shaft lying above the needle, said thread-carrying looper having a hole for the thread which together with the needle thread forms a stitch, a cross-head for rotatably supporting said shaft, said cross-head being angularly adjustable about an axis perpendicular to the longitudinal axis of said shaft, means for angularly adjusting and securing the angular position of said cross-head with respect to the machine frame, means for oscillating said shaft carrying the looper about its own axis, another shaft having its axis arranged in a plane perpendicular to said needle bar and said first mentioned shaft and inclined to the vertical plane containing said first mentioned shaft, a spreader secured to said shaft, and means for oscillating said other shaft.

2. In a sewing machine for effecting a two-thread chain stitch having a pair of adjacent feed-cups rotatable in opposite directions about vertical axis clamping the work and feeding it forward, the combination comprising, a frame, a main driving shaft arranged transversely of the frame, a needle bar for carrying a needle and slidably mounted in the machine frame in a direction perpendicular to said main shaft in a plane situated above the main shaft for reciprocating said needle over a path extending through the axes of said feed-cups and perpendicular thereto, a shaft arranged above said needle bar, a thread-carrying looper clamped to an end of the last mentioned shaft lying above the needle, said thread-carrying looper having a hole for the thread which together with the needle thread forms a stitch, a cross-head for rotatably supporting said shaft, said cross-head being adjustably mounted about an axis parallel with said main shaft, said cross-head having an extension on an end disposed near the needle, a collar surrounding said extension, a plate fast with said collar, said plate having a slot, a screw in the machine frame extending through said slot for retaining said plate and said cross-head in the desired position with respect to the machine frame, another shaft having its axis arranged in a plane perpendicular to said needle bar and said first mentioned shaft and inclined to the vertical plane containing the first-mentioned shaft, a spreader secured to said shaft, and means for transmitting drive from said main driving shaft to said needle bar and said shafts carrying said looper and said spreader.

3. Sewing machine for effecting a two-thread chain stitch and having a machine frame, the combination comprising, a pair of counter-rotatable feed cups between which the work is clamped for forward feed, a needle bar for carrying a needle and slidably mounted in the machine frame for reciprocating said needle over a path extending through the axes of the cups and perpendicular thereto, means for reciprocating said needle bar, a shaft oscillatable about an axis arranged above said needle bar, a thread-carrying looper clamped to an end of said shaft lying above the needle, said thread carrying looper having a hole for the thread which together with the needle thread forms a stitch, a cross head for rotatably supporting said shaft, said cross-head being adjustable about an axis perpendicular to the axis of said shaft and in the direction of said first mentioned axis, means for angularly adjusting and securing the angular position of said cross-head with respect to the machine frame, means for axially adjusting and securing the axial position of said cross-head with respect to the machine frame, and means for oscillating said shaft carrying the looper about its own axis, another shaft having its axis arranged in a plane perpendicular to said needle bar and said first mentioned shaft and inclined to the vertical plane containing the first-mentioned shaft, a spreader secured to said other shaft, and means for oscillating said other shaft.

References Cited in the file of this patent

UNITED STATES PATENTS

| | | |
|---|---|---|
| 2,518,987 | Hacklander | Aug. 15, 1950 |
| 2,603,173 | Olleo | July 15, 1952 |
| 2,759,442 | Schweda et al. | Aug. 21, 1956 |
| 2,884,884 | Hacklander | May 5, 1959 |

FOREIGN PATENTS

| | | |
|---|---|---|
| 838,436 | France | Dec. 7, 1938 |
| 527,460 | Germany | June 18, 1931 |